(12) United States Patent
Haan et al.

(10) Patent No.: US 6,260,531 B1
(45) Date of Patent: Jul. 17, 2001

(54) VALVE SEAT INSERT

(75) Inventors: Deborah Martha Haan, Royal Oak; Bradley David Opperman, Belleville, both of MI (US); Manfred Kraemer, Uppershausen; Peter Birtel, Donaustrasse, both of (DE)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/538,171

(22) Filed: Mar. 30, 2000

(51) Int. Cl.[7] ........................................ F02N 3/00
(52) U.S. Cl. ............................................. 123/188.8
(58) Field of Search ........................................ 123/188.8

(56) References Cited

U.S. PATENT DOCUMENTS

| 2,017,154 | 10/1935 | Larkin. | |
|---|---|---|---|
| 2,396,730 | 3/1946 | Whitfield. | |
| 2,600,529 | 6/1952 | Gregory. | |
| 3,868,953 | 3/1975 | Roll. | |
| 4,108,132 | * 8/1978 | Hayashi | 123/188.8 |
| 4,236,495 | 12/1980 | Rosan, Jr.. | |
| 5,020,490 | 6/1991 | Seko. | |
| 5,742,020 | 4/1998 | Adachi. | |
| 5,809,968 | 9/1998 | Tsuchida. | |
| 5,834,629 | * 11/1998 | Hammarberg | 73/35.08 |
| 5,934,238 | 8/1999 | Wang. | |

* cited by examiner

Primary Examiner—Noah P. Kamen
(74) Attorney, Agent, or Firm—Ford Global Tech., Inc

(57) ABSTRACT

A valve seat insert 10 for use in combination with a cylinder head 12. Insert 10 is disposed within a cavity 24 formed within cylinder head 12 and includes several notches 40 which cooperate with surface 26 within cavity 24 to form a plurality of passages or channels 50 which allow fuel 18 to freely pass between surface 26 and insert 10. Channels 50 are effective to substantially prevent fuel 18 from becoming trapped between insert 10 and cylinder head 12, thereby preventing the formation of corrosive acids and byproducts.

12 Claims, 2 Drawing Sheets

VALVE SEAT INSERT

FIELD OF THE INVENTION

This invention relates to a valve seat insert and more particularly, to a valve seat insert which substantially prevents corrosion within an engine cylinder head.

BACKGROUND OF THE INVENTION

Valve seat inserts are used in automotive vehicles and are typically and operatively disposed within the cylinder head of a vehicle engine. Particularly, valve seat inserts are selectively forced or press-fitted into a "pocket" or cavity within the cylinder head and are typically manufactured from a relatively hard, wear-resistant and heat-resistant material, such as a cast or sintered metal material. When operatively installed, the valve seat inserts are effective to provide a seating surface for the engine's valves, thereby allowing the valves to selectively open and close. While these valve seats or valve seat inserts provide a strong and durable seating surface for the engine's valves, they suffer from some drawbacks.

For example and without limitation, one such drawback arises from the press-fit engagement or mating of the valve seat insert within the cavity or pocket of the cylinder head. Particularly, the press-fit mating of the valve seat insert results in the formation of a minute gap or crevice between the "top" or back surface of the cavity and the "top" surface of the valve seat insert, which abuttingly engages the "top" or back surface of the cavity. During operation, liquid or fuel passes into this gap and becomes "trapped" or held within the gap. While this "trapped" or held fuel is relatively benign in traditional or conventional engines which burn fuel containing a relatively low percentage of ethanol, it can cause severe damage to engines which burn fuel containing a relatively high percentage of ethanol.

That is, in engines which burn fuel containing a relatively high percentage of ethanol (e.g., greater than 50% ethanol), the trapped or held fuel may form and/or promote the formation of corrosive acids or byproducts which corrode the cylinder head. Over time, this corrosion can become extremely severe, especially in cylinder heads which are manufactured from an aluminum material or alloy, and will oftentimes break or wear through to the engine's water jacket, thereby causing engine failure.

There is therefore a need for a valve seat insert which overcomes some if not all of the drawbacks of prior valve seat inserts.

SUMMARY OF THE INVENTION

It is a first object of the invention to provide a valve seat insert which is adapted for use within a cylinder head and which overcomes at least some of the previously delineated drawbacks of prior valve seat inserts.

It is a second object of the invention to provide a valve seat insert which is adapted for use in combination with a cylinder head and which substantially prevents corrosion of the cylinder head.

It is a third object of the invention to provide a valve seat insert which is adapted for use in combination with a cylinder head and which includes several grooves or passages which allow fluid and/or fuel to pass freely between the cylinder head and the insert, thereby preventing corrosion of the cylinder head.

According to a first aspect of the present invention, a valve seat insert is provided. The valve seat insert is adapted for use within a cylinder head having an amount of fuel and a cavity having a first surface. The valve seat insert is disposed within the cavity and has a second surface which engages the first surface and which includes a plurality of notches which cooperate with the first surface to form a plurality of passages which are effective to substantially prevent fuel from becoming trapped between the first surface and the second surface, thereby substantially preventing corrosion of the cylinder head.

According to a second aspect of the present invention, a method is provided for substantially preventing corrosion of a cylinder head having a valve port which receives an amount of fuel and which includes a cavity having a first surface, and a valve seat insert which is secured within the cavity and which includes a second surface which abuts the first surface. The method includes the step of forming a plurality of notches on the second surface of the valve seat insert, effective to form a plurality of passages between the second surface and the first surface. The plurality of passages is effective to substantially prevent fuel from becoming trapped between the first surface and the second surface, thereby preventing corrosion of the cylinder head.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
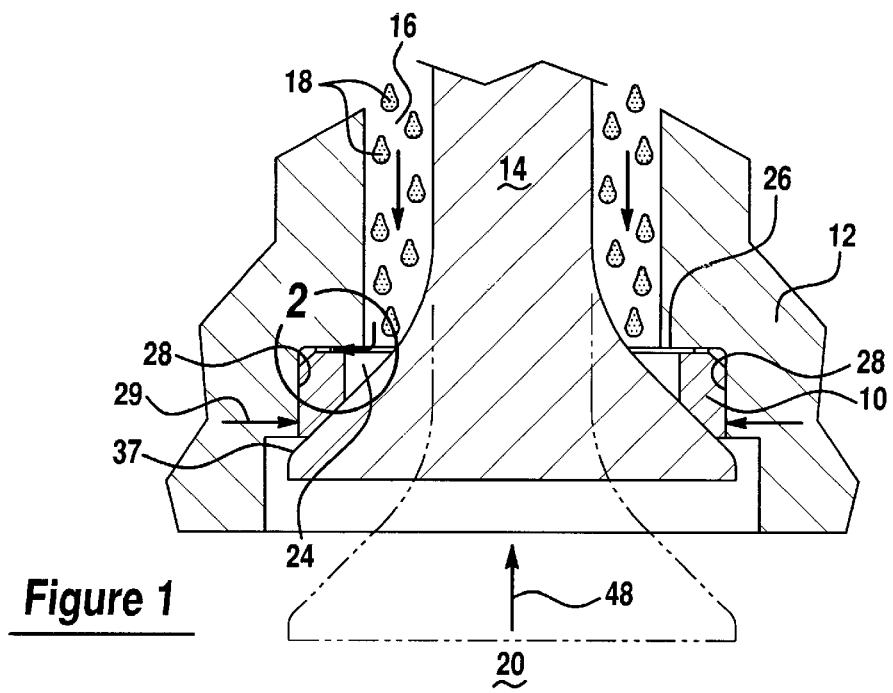
FIG. 1 is a partial sectional view of a valve seat insert which is made in accordance with the teachings of the preferred embodiment of the invention and which is operatively disposed within a cylinder head.
Figure 2:
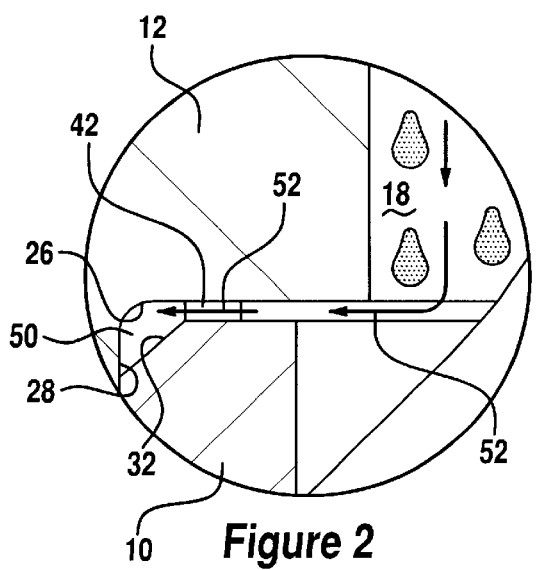
FIG. 2 is an enlarged view of the region 2 which is illustrated in FIG. 1.
Figure 3:
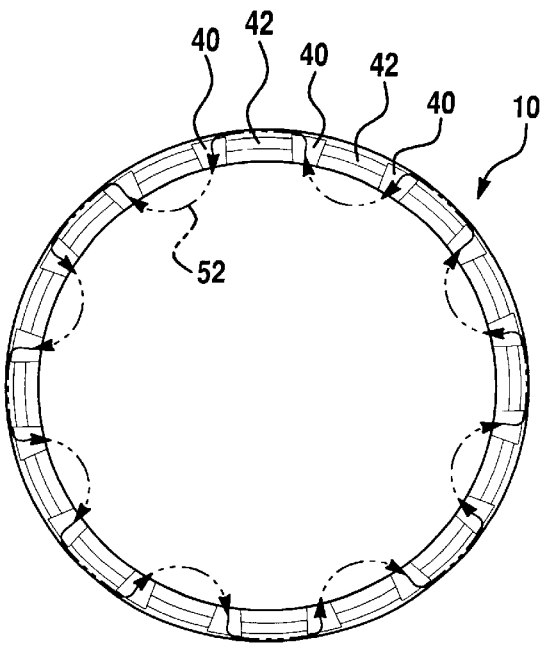
FIG. 3 is a "top" view the valve seat insert shown in FIG. 1.
Figure 4:
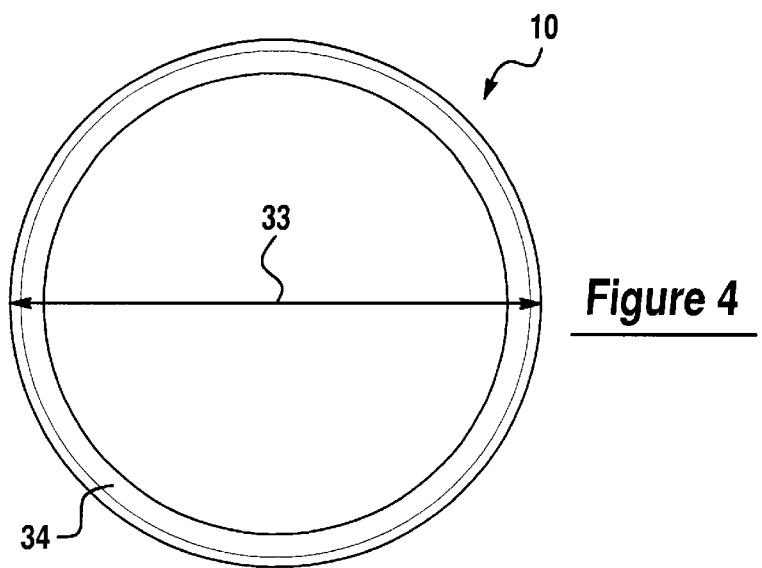
FIG. 4 is a "bottom" view the valve seat insert shown in FIG. 1.
Figure 5:
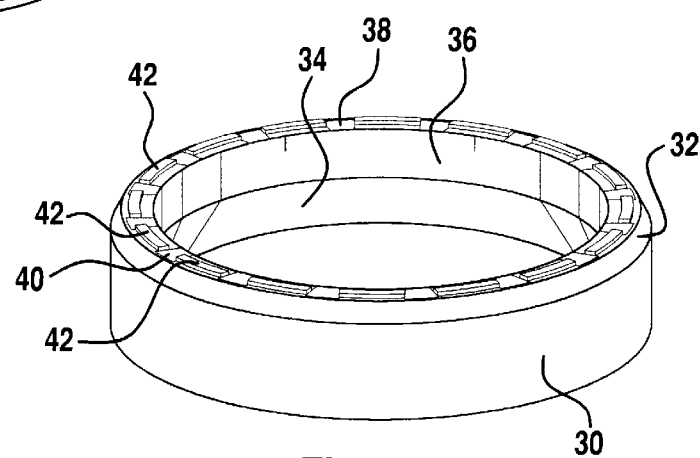
FIG. 5 is a perspective view of the valve seat insert shown in FIG. 1.

Referring now to FIGS. 1–5, there is shown a valve seat insert or member 10 which is made in accordance with the teachings of the preferred embodiment of the invention and which is adapted for use within a vehicle engine, and more particularly, within the cylinder head 12 of a vehicle engine. Cylinder head 12 includes a fuel intake port or conduit 16 through which liquid and/or vaporized fuel 18 travels for combustion within one of the cylinders 20 of the engine. A conventional valve 14 is movably disposed within the cylinder head 12 and controls the transfer of fuel into cylinder 20. Particularly, valve 14 is selectively movable from a first position in which valve 14 engages valve seat 10, thereby preventing fuel 18 from entering cylinder 20, and a second position (shown in phantom in FIG. 1) in which valve 14 is removed from valve seat 10, thereby allowing fuel 18 to enter cylinder 20.

Cylinder head 12 further includes an integrally formed pocket or cavity 24 in which insert 10 is operatively disposed. Pocket or cavity 24 is formed around or circumscribes port 16 and is defined or formed by a "back" or "top" surface 26 and an outer annular surface or perimeter 28.

In the preferred embodiment of the invention, valve seat insert 10 is generally circular or ring shaped and has an outer annular surface 30. Surface 30 has an outer diameter 33 which is slightly greater than the diameter 29 of outer perimeter 28 of cavity 24, thereby allowing for a "press-fit" mating between surfaces 30 and 28. Particularly, in the preferred embodiment, insert 10 is press-fitted into cavity 24, effective to cause outer annular surface 30 to abuttingly and frictionally engage surface 28 of cavity 24, thereby securing insert 10 within cavity 24. Outer annular surface 30 includes an angled or "ramped" portion 32 which assists in centering and/or guiding insert 10 into cavity 24 during the press-fitting procedure. Insert 10 further includes an inner annular surface 36 having an angled or "ramped" portion or surface 34. Portion or surface 34 is adapted to conformingly and sealingly receive and engage the outer surface 37 of valve 14, thereby allowing valve 14 to selectively seal port 16. Insert 10 is preferably manufactured from a relatively durable, wear-resistant, and heat-resistant metal material, such as hardened or cast steel or iron.

Insert 10 further includes a "top" or "back" surface 38 having several notches or recessed portions 40 which are integrally formed within surface 38. Each notch or recessed portion 40 is separated by a relatively thin tab, step or protrusion 42. When insert 10 is installed within cylinder head 12, each tab, step or protrusion 42 abuttingly engages surface 26. In one non-limiting embodiment, notches 40 and/or tabs 42 are formed on surface 38 in a conventional manner such as by a conventional machining process.

During assembly of the cylinder head, insert 10 is forced (e.g., press-fitted) into cavity 24 in the direction of arrow 48. Insert 10 is forced or moved in the direction of arrow 48 until tabs 42 abuttingly engage surface 26. In other alternate embodiments, other methods of securing insert 10 within cavity 24 may be used. When insert 10 is installed, notches 40, tabs 42 and surface 32 cooperate with surfaces 26 and 28 of cylinder head 12 to form a several passages or channels 50 between insert 10 and cylinder head 12.

In operation, liquid and/or vaporized fuel 18 resides within port 16 and is selectively discharged into cylinder 20 by the controlled movement and/or actuation of valve 14. During operation, passages or channels 50 allow for fuel 18 to pass freely between insert 10 and cylinder head 12. Particularly, fuel traveling or flowing through port 16 passes through notches 40 in the directions illustrated by arrows 52 and through channels 50, thereby penetrating and traveling between insert 10 and cylinder head 12. The passages 50 allow fuel 18 to travel freely between insert 10 and cylinder head 12, and substantially prevent fuel 18 from becoming trapped between the insert 10 and the cylinder head 12, thereby preventing the formation of corrosive byproducts or acids. This "free flow" of fuel 18 further "cools" or increases the rate of heat dissipation between insert 10 and cylinder head 12, thereby further preventing the formation of corrosive acids or byproducts which may be catalyzed by relatively high temperatures. The relatively "thin" raised portions or steps 42 maximize the area or volume in which fuel may freely pass between insert 10 and cylinder head 12, thereby further preventing fuel 18 from becoming trapped between insert 10 and cylinder head 12 and from corroding cylinder head 12. By "thinning" the steps or tabs 42, the surface area of insert 10 and cylinder head 12 which is exposed to fuel 18 is desirably increased, thereby further increasing the convection or removal of heat between insert 10 and cylinder head 12. In one alternate embodiment, surfaces 26 and 28 are anodized and/or treated with a corrosive resistant material, effective to further prevent the corrosion of cylinder head 12.

Figure 6:
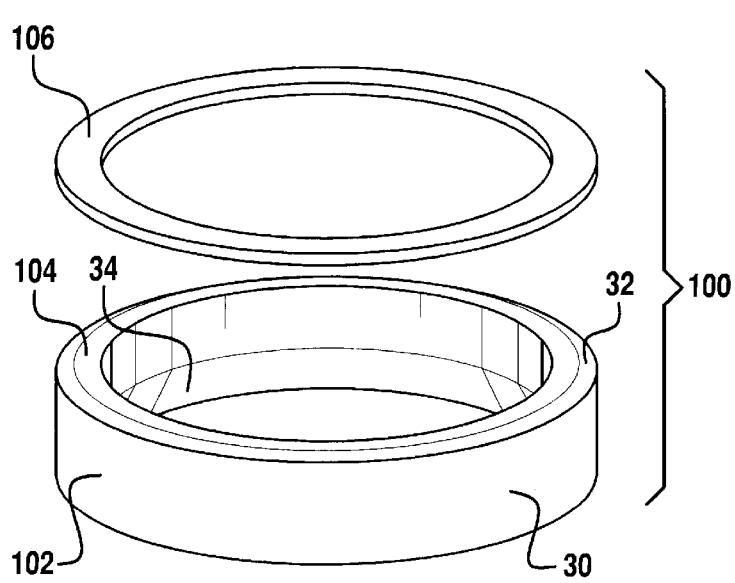
FIG. 6 is a perspective view of a valve seat insert assembly which is made in accordance with the teachings of a second embodiment of the present invention.

Referring now to FIG. 6, there is shown a valve seat insert assembly 100 which is made in accordance with the teachings of a second embodiment of the present invention. Valve seat insert assembly 100 includes a valve seat insert or member 102 which is substantially similar to valve seat insert 10, except that notched surface 38 has been replaced with a relatively smooth or flat surface 104. Assembly 100 further includes a generally ring shaped member 106. Unless otherwise specified, all other portions or elements of insert 102 are substantially identical to the elements and portions of insert 10 having the same reference numerals. Member 106 is manufactured from a resilient and corrosive-resistant material and in one non-limiting embodiment, member 106 is manufactured from a teflon material. In assembly, member 106 is disposed between insert 102 and surface 26. Particularly, when insert 102 is pressed or forced into cavity 24, member 106 is forcibly pressed between smooth surface 104 and surface 26, and is effective to form a seal between insert 102 and cylinder head 12.

In operation, the seal provided by member 106 substantially prevents any of fuel 18 from penetrating or passing between insert 102 and surface 26. In this manner, valve seat assembly 100 prevents any fuel 18 from entering and/or becoming trapped between insert 102 and cylinder head 12, and thereby eliminates the formation of corrosive acids or byproducts between the insert 102 and the cylinder head 12.

In one alternate embodiment, member 106 is replaced with an epoxy or phenolic material which is applied to surface 104 and which forms a seal between insert 102 and cylinder head 12. In yet another alternate embodiment, member 106 is eliminated and insert 102 is cast directly into cylinder head 12, thereby eliminating any gaps between insert 102 and cylinder head 12, which can trap fuel 18 and promote the corrosion of cylinder head 12.

It is to be understood that the invention is not to be limited to the exact construction and/or method which has been illustrated and discussed above, but that various changes and/or modifications may be made without departing from the spirit and the scope of the invention.

What is claimed is:

1. A valve seat insert for use within a cylinder head having a valve port which receives an amount of fuel and which includes a cavity having a first surface, said valve seat insert being shaped to conformingly fit within said cavity and having a second surface which includes a plurality of notches which are shaped to form a plurality of passages within said cavity when said valve seat insert is fitted within said cavity, said passages being effective to substantially prevent fuel from becoming trapped between said first surface and said second surface, thereby substantially preventing corrosion of said cylinder head.

2. The valve seat insert of claim 1 further comprising a plurality of relatively thin projections which are formed upon said second surface and which are shaped to abuttingly engage said first surface when said valve seat insert is fitted within said cavity.

3. The valve seat insert of claim 1 further comprising a ramped surface which is shaped to comformingly engage a valve.

4. The valve seat insert of claim 1 wherein said valve seat insert is shaped to be press-fit within said cavity.

5. The valve seat insert of claim 1 wherein said valve seat insert is adapted for use with a cylinder head which is manufactured from an aluminum material.

6. The valve seat insert of claim 5 wherein said valve seat insert is adapted for use with a cylinder head having a first surface which is anodized.

7. A method for substantially preventing corrosion of a cylinder head having a valve port which receives an amount of fuel and which includes a cavity having a first surface, and a valve seat insert which is secured within said cavity and which includes a second surface which abuts said first surface, said method comprising the step of:

forming a plurality of notches on said second surface of said valve seat insert, effective to form a plurality of passages between said second surface and said first surface, said plurality of passages being effective to substantially prevent said amount of fuel from becoming trapped between said second surface and said first surface, thereby preventing corrosion of said cylinder head.

8. The method of claim 7 wherein said second surface includes a plurality of projections, said method further comprising the step of:

thinning said plurality of projections.

9. The method of claim 7 wherein said valve seat insert is press-fitted into said cavity.

10. The method of claim 7 further comprising the step of annodizing said first surface of said cylinder head.

11. The method of claim 7 wherein said cylinder head is manufactured from an aluminum material.

12. The method of claim 7 wherein said plurality of notches are machined into said second surface of said valve seat insert.

* * * * *